United States Patent [19]

Hunt

[11] Patent Number: 5,167,582
[45] Date of Patent: Dec. 1, 1992

[54] TORQUE TRANSMITTING FLEXIBLE COUPLING WITH HELICAL SPRING ELEMENT

[76] Inventor: Anthony O. Hunt, Healthwaite Hall, Weeton, Leeds, England, LS17 0BQ.

[21] Appl. No.: 673,165
[22] PCT Filed: Jul. 30, 1987
[86] PCT No.: PCT/GB87/00542
 § 371 Date: Feb. 21, 1989
 § 102(e) Date: Feb. 21, 1989
[87] PCT Pub. No.: WO88/01026
 PCT Pub. Date: Feb. 11, 1988

Related U.S. Application Data

[63] Continuation of Ser. No. 474,679, Feb. 6, 1990, abandoned, which is a continuation of Ser. No. 312,801, Feb. 21, 1989, abandoned.

[30] Foreign Application Priority Data

Jul. 31, 1986 [GB] United Kingdom ................ 8618711
Jul. 31, 1986 [GB] United Kingdom ................ 8618712
Jul. 31, 1986 [GB] United Kingdom ................ 8618713

[51] Int. Cl.⁵ ............................................. F16D 3/50
[52] U.S. Cl. ................................................. 464/78
[58] Field of Search ............... 464/51, 57, 60, 78, 464/106, 197

[56] References Cited

U.S. PATENT DOCUMENTS

| | | | |
|---|---|---|---|
| 1,337,646 | 4/1920 | Eckart | 464/60 X |
| 1,429,580 | 9/1922 | Geiger | 464/60 |
| 1,561,119 | 11/1925 | Smith | 464/60 |
| 1,714,105 | 5/1929 | Ramsdell | 464/57 X |
| 2,343,079 | 2/1944 | Pickwell | 464/78 X |
| 2,926,541 | 3/1960 | Adams | 464/78 X |
| 3,390,546 | 7/1968 | Jewell | 464/78 |
| 3,537,275 | 11/1970 | Smith | 464/78 |
| 4,203,305 | 5/1980 | Williams | 464/60 |

FOREIGN PATENT DOCUMENTS

| | | | |
|---|---|---|---|
| 364769 | 8/1906 | France . | |
| 776041 | 1/1935 | France | 464/60 |
| 1501311 | 11/1967 | France . | |
| 2300939 | 9/1976 | France . | |
| 2480376 | 10/1981 | France . | |
| 490964 | 11/1975 | U.S.S.R. | 464/57 |
| 206298 | 11/1923 | United Kingdom | 464/60 |
| 284014 | 1/1928 | United Kingdom | 464/60 |

Primary Examiner—Daniel P. Stodola
Assistant Examiner—John P. Darling
Attorney, Agent, or Firm—Merchant & Gould, Smith, Edell, Welter & Schmidt

[57] ABSTRACT

A number of embodiments of flexible coupling for transmitting torque from one rotatable member to another, and in such a way as to compensate automatically for any small misalignments between the driving and driven ends of the coupling. In the embodiment of FIG. 1 and 2, the flexible coupling (10) comprises a hollow cylindrical body (11) having an annular wall, and a helical spring configuration (14) formed in the annular walls with the turns thereof extending radially outwardly from the hollow interior (13) of the cylindrical body to the outer periphery of the cylindrical body. The helical spring configuration (14) comprises at least two spring formations extending circumferentially and adjacent to each other around the axis (15) of the cylindrical body (11), each formation extending in a continuous spiral from a start at one end portion of the cylindrical to a finish at the opposite end portion.

6 Claims, 5 Drawing Sheets

TORQUE TRANSMITTING FLEXIBLE COUPLING WITH HELICAL SPRING ELEMENT

This is a continuation of application Ser. No. 07/474679, filed Feb. 6, 1990, now abandoned, which is a continuation of application Ser. No. 07/312,801, filed Feb. 21, 1989, now abandoned.

This invention relates, in one aspect, to a flexible coupling of the type suitable for transmitting torque from one rotatable member to another and is particularly, though not exclusively, concerned with a flexible coupling for transmitting torque between driving and driven shafts in which there may be slight misalignments in the static and/or dynamic state.

There are many instances of use in which it is essential for a flexible coupling to be able to compensate automatically, by self-adjustment, for misalignment between driving and driven members, (and also to move laterally if required) and one of these uses includes the transmission of drives in industrial robots. Another use is in the formation of conductor lines on semi-conductor wafers, in which motors are used which drive suitable devices to form the lines, and in which extremely accurate control over the transmission of the drive is necessary, such drive normally including some form of flexible coupling.

One known type of flexible coupling comprises a generally cylindrical member which is of one-piece construction, and which has a single start helical spring configuration formed in the cylindrical member. The cylindrical member is hollow, having a substantial radial wall thickness, and the spring configuration extends radially inwardly from the outer periphery of the cylindrical member until the hollow interior of the member is reached. The spring configuration may be formed by machining (a "cut spring"), or by casting of the entire cylindrical member with the required spring configuration. This known coupling member therefore functions in the manner of a helical spring, even although the turns of the spring have substantial radial thickness, and therefore has an in-built tendency to "wind-up" as torque is transmitted from one end of the cylindrical member to the other and via the turns of the helical spring. Clearly, this can give rise to inaccuracies in the transmission of torque, especially when, for example, precise angular increments of rotation are required from one rotary member to another.

Therefore, while the known flexible coupling has the necessary flexibility, and resilience, to accommodate axial misalignments (and axial movements), and also variable torque transmission, it does not have sufficient stiffness to suit the requirements of some users, and particularly where there is a need for very accurate transmission of angular increments of drive.

Accordingly, there has developed a need to provide an improved design of flexible coupling which has sufficient flexibility and resilience to meet the requirements of a "flexible coupling", and yet which is able to transmit accurately i.e. without undue torsional deformation, rotation between an input and an output end of the coupling.

According to the invention there is provided a flexible coupling which comprises a hollow cylindrical body having an annular wall, and a helical spring configuration formed in the annular wall with the turns thereof each extending radially outwardly from the hollow interior of the cylindrical body to the outer periphery of the cylindrical body:

in which the helical spring configuration comprises at least two spring formations extending circumferentially and adjacent to each other around the axis of the cylindrical body, each formation extending in a continuous spiral from a start at one end portion of the cylindrical body to a finish at the opposite end portion.

In order to increase the strength of each spring formation at its start and finish (where it is joined to solid end pieces of the hollow cylindrical body), it is preferred to make the turns thicker (with respect to the axis of the body), than the remaining turns thereof.

By arranging at least two separate helical spring formations in the annular wall of the cylindrical body, a coupling is provided which is sufficiently flexible in the sense that it can absorb any axial misalignment between an input drive to an input end of the cylindrical body and an output drive from an output end of the cylindrical body, and also any tendency for relative axial, and rotary, movement between the input and output drives. However, the helical spring formation is "stiffer" than the known single start (helical) flexible coupling, so that a more accurate, and less variable transmission of torque can take place between the input end and the output end.

If only two helical spring formations are provided, it will be preferable for the "starts" to be circumferentially spaced from each other by 180°, and with similar angular spacing apart of the "finishes". If four helical spring formations are provided, then the relative angular separation of the circumferentially successive starts and finishes will be 90°.

A particularly preferred embodiment of flexible coupling according to the invention has three helical spring formations formed in the annular wall, in which case the angular separation of successive starts and finishes will be 120°. This is a particularly stable arrangement from a dynamic point of view. Conveniently, each start of one formation is angularly spaced from its respective finish by about 30°.

The cylindrical body may be made of aluminium alloy, stainless steel or suitable plastics, such as Acetal or Torlon, or natural or synthetic rubber though for some uses customers are finding stainless steel to be particularly suitable.

Conveniently, the cylindrical body is formed as a turned body and then the required spring formation may be formed by machining on a programmed machine tool. However, the spring formations may be achieved in other ways, such as, for example, by casting, forging or electro-forming, or by laser cutting.

Alternatively, the spring formations may be formed initially by any suitable method, and then separate end pieces, in the form of plugs, may be attached one to each axial end of the spring formations. In a case in which the flexible coupling is required to transmit drive between a driving shaft and a driven shaft, the plugs may be formed so as to be capable of being coupled drivingly each with a respective shaft.

It should be understood that a flexible coupling according to the invention is not restricted solely to use for transmitting drive between a driving shaft and a driven shaft, or other forms of driving and driven members. Indeed, for certain uses, the flexible coupling may be suitable to be used as a flexible mounting or "damper", or to be coupled solely at one end with a drive member. The flexible coupling may, therefore, be suitable for special uses e.g. as part of a laser device, in which one end of the cylindrical body is coupled with a drive member, whereas the opposite end carries a reflective surface onto which a laser beam of light can impinge.

The invention also relates, in a further aspect, to a flexible coupling of the type suitable for transmitting torque from one rotatable member to another and is particularly, though not exclusively, concerned with a flexible coupling for transmitting torque between driving and driven shafts in which there may be slight misalignments in the static and/or dynamic state.

Another known type of flexible coupling is disclosed in GB Patent Specification No. 1,206,537, which has a multistart arrangement of helical slots formed through the wall of a cylindrical metal tube and which define three separate helical "beams" which extend circumferentially of the cylindrical metal tube in a spiral about the general longitudinal axis of the tube. Each beam forms a helical type spring, and the "starts" of the springs are circumferentially spaced from each other by 120° and the turns of the three helical springs formed by the beam extend substantially parallel, and one within the other, as they extend in spirals about the axis of the cylindrical metal tube.

In the flexible coupling known from GB Patent Specification No. 1,206,537, the radial extent of each beam, (which forms a respective helical spring extending circumferentially about the axis of the cylindrical tube), remains substantially constant. While these known flexible couplings perform generally satisfactorily for most purposes, it is a fact that, for arduous operating conditions, if the known flexible coupling should fail, any failure is likely to take place at the regions at which each helical beam starts its traverse about its periphery of the cylindrical tube i.e. at the region where the respective helical slot is first formed through the wall of the cylindrical tube, in that this is the region of maximum applied stress in service. Therefore, while the flexible coupling known from GB Patent Specification No. 1,206,537 can provide a generally more accurate transmission of torque between driving and driven members, than with the single helical spring type of flexible coupling first referred to, in that it has more torsional stiffness by virtue of the three spring arrangement, it can be liable to failure at the starting point of any one of the three helical spring formations formed therein. The "start" region of each helical beam will be the region of maximum applied stress, in that it will be via this region that torsional loads are transmitted between each beam and the respective end piece of the cylindrical tube which will be coupled with a driving or driven member. In addition, there may be a tendency for flexure of the beam to take place about this region in service, and over a period of time the fatigue stress generated may also cause premature failure at this start region.

Therefore, given that the radial, and also the axial extent of each helical beam remains constant, there is normally unused torsional loading capacity provided in the turns of each helical beam intermediate the starts and finishes thereof. Further, if attempt should be made to strengthen the known coupling, by increasing the radial and/or axial extent of each helical beam, to provide additional strength at the starts and finishes, this will be an inefficient use of material, in that the intermediate turn portions of each helical beam will have still further unused torsional load capacity.

The present invention has therefore been developed primarily though not exclusively, with a view to providing an improvement to either of the two known types of flexible coupling referred to above, by virtue of alteration in the design of the parameters of the turn portions of the or each helical beam or spring, which are intermediate the starts and finishes thereof.

According to the further aspect of the invention there is provided a flexible coupling which comprises a hollow cylindrical body having an annular wall, and a helical spring arrangement in the annular wall with the turns thereof each extending radially outwardly from the hollow interior of the body to the outer periphery of the body, in which:

the helical spring arrangement extends circumferentially from a start at one of said ends of the body and about the longitudinal axis of the body to the finish of the spring arrangement; and the radial extent of the turns of the helical spring arrangement is greater at the start and at the finish than that of the turns which are intermediate the start and the finish.

By arranging for the intermediate turns of the helical spring arrangement to have a lesser radial extent than the turns at the start and the finish, it is ensured that the turns at the start and finish are stronger, and also the intermediate turns will have more resiliency, and these two factors (alone or in combination) are believed to be responsible for an axial displacement of the high stress regions away from the start and finish of the helical spring arrangement, with resultant reduction in risk of failure of the coupling at the start and finish of the helical spring arrangement.

Conveniently, the greater radial extent of the turns at the start and finish may be achieved by making the outer peripheries of the intermediate turns to be less than that of the turns at the start and finish.

Thus, by arranging for the outer periphery of the turns of the helical spring arrangement to be radially larger at the start and finish, the remaining turns define an annular waist and its dimensions can be adjusted so as to "tune" the stiffness of the coupling to meet any specific drive requirements, in addition to moving (as indicated above) the stress regions away from the connection regions (start and finish) of the spring arrangement with the end pieces or "hubs" towards a middle or intermediate region of the helical spring arrangement.

Preferably, the helical spring arrangement comprises two or more separate spring formations having respective turns extending circumferentially and adjacent to each other about the axis of the cylindrical body, and each having its own start and finish with the start and finish of one formation being circumferentially spaced from the respective start and finish of the adjacent spring formation.

In one preferred arrangement, three separate spring formations are provided, which are circumferentially staggered by 120° from each other. In one preferred embodiment of the invention, the spring arrangement extends continuously in a generally helical arrangement around the circumference of the cylindrical body and between a solid end piece at each end of the body i.e. both the start and the finish are each located adjacent to a respective end of the cylindrical body. However, in another embodiment, there is an intermediate solid piece, and two separate helical spring arrangements are provided, each extending continuously between a respective end piece and the intermediate solid piece.

In order to further strengthen the spring arrangement at the start and finish, the axial extent of each turn at the start and finish may be made greater than for the remaining turns, so that the, or each spring formation effectively "bells-out".

The preferred materials from which flexible couplings according to the invention are made are aluminium alloy, and also stainless steel, the latter material being particularly favoured for many new uses of the flexible couplings. Alternative material includes plastics, and natural and synthetic rubber.

The invention further relates, in another aspect, to a flexible coupling and is particularly, though not exclusively, concerned with a flexible coupling for transmitting torque between a driving element and a driven element.

It is known from GB patent specification No. 1206537 to provide a flexible coupling which has a multi-start arrangement of helical slots formed through the wall of a cylindrical metal tube and which define three separate helical "beams" which extend circumferentially of the cylindrical metal tube in a spiral about the general longitudinal axis of the tube. Each beam forms a helical type spring, and the "starts" of the springs are circumferentially spaced from each other by 120° and the turns of the three helical springs formed by the beams extend substantially parallel, and one within the other, as they extend in spirals about the axis of the cylindrical metal tube.

However, in this known flexible coupling, each helical slot extends circumferentially about the axis of the cylindrical tube through less than one complete revolution of the tube wall i.e. the start and finish ends of each helical slot, and therefore also the corresponding helical spring "beam" subtend an angle of less than 360° at the axis of the cylindrical tube.

In a preferred embodiment of the known flexible coupling, there are two separate spring arrangements, each of which is connected to a respective end piece of the cylindrical metal tube. The spring arrangements extend towards each other, but are interconnected by a solid intermediate annular portion of the cylindrical metal tube. Thus, this embodiment provides a cylindrical body having two solid end pieces, an intermediate solid piece, and a respective "three start" helical spring arrangement extending between each end piece and the facing end of the intermediate piece.

The material from which the known embodiment has been made primarily is aluminium, but currently there is a growing demand for flexible couplings of this general type to be available in stainless steel. This is a requirement of particular users of flexible couplings, who now demand the availability of stainless steel in view of its superior operating performance for the new uses of the couplings. However, given that the "beams" of the known helical spring arrangement subtend an angle of less than 360°, it has been found that attempts at manufacture of these known embodiments of flexible couplings in stainless steel do not result in a satisfactory product, and particularly by reason of the "stiffness" of such a coupling (and particularly the loss of overall flexibility of the coupling) when made of stainless steel, which is a less resilient material than other materials normally employed to make the couplings e.g. aluminium. Thus, the customers are requiring a coupling which is torsionally sufficiently stiff at angular increments of rotation can be accurately transmitted from one end to the other and through the coupling substantially without any "wind-up" of the turns of the coupling, and yet which still functions as a "flexible" coupling. To a certain extent, these dual requirements are mutually contradictory.

The present invention therefore seeks to provide an improved construction of flexible coupling of the general type referred to above, and which can be made of stainless steel and yet has a required degree of resilient demanded by potential customers.

According to this other aspect of the invention there is provided a flexible coupling which comprises a cylindrical body having a pair of opposed end portions, and a solid intermediate portion, and a respective helical spring arrangement interconnecting each end portion and a facing end of the intermediate portion, in which each helical spring arrangement comprises a multi-start arrangement of separate spring formations which are wound one within the other, each formation extending in a spiral from a start at one portion to a finish at the corresponding other portion and about the general longitudinal axis of the cylindrical body through an angle of at least 360°.

When, as is preferred, the flexible coupling is made of stainless steel, this provides a coupling which is durable, and yet which can have a required degree of resilience to meet customer requirements.

In the application of a flexible coupling of the invention for the transmission of torque between a driving element and a driven element e.g. between two substantially co-axial shafts, one end portion of the cylindrical body will comprise the power input to the coupling, and the opposite end portion will be the power output. However, the invention is not limited to use of the flexible coupling for transmitting torque. Thus, the flexible coupling may be used as a flexible mounting, or as a "damper" in which case each end portion of the cylindrical body will be adapted for securement to a respective one of two separate portions or pieces of machines which are to be flexibly coupled together.

Conveniently, each multi-start spring arrangement comprises three separate helical springs, having respective "starts" which are circumferentially spaced by 120° from each other. Each spring formation extends circumferentially around the longitudinal axis of the cylindrical body through at least 360°, and preferably up to a maximum of 400°. By extending each spring formation circumferentially about the axis of the cylindrical body through at least 360°, this tends to lessen the rather rigid nature of stainless steel, when used in a flexible coupling, and continuation of the spiral about this axis causes progressive increase in the "resiliency" of the turns of the stainless steel spring formations.

While the flexible coupling according to the invention is particularly suitable for transmitting drive between two facing ends of substantially co-axial shafts, it should be understood that the features of the invention, as applied to a flexible coupling, may also be applied in a shaft or drive-train arrangement, by being incorporated as an integral part of such a shaft or drive train arrangement. Thus, a "flexible coupling" can be incorporated as an integral part of a shaft, by suitable machining or other manufacturing operations, applied to a shaft. A "flexible coupling" may be particularly readily incorporated in an already hollow drive shaft, by suitable machining through the annular wall of the shaft in order to form the required multi-start helical spring formations, and the solid end portions, and intermediate portion referred to above in connection with the flexible coupling per se.

If it is required to increase the strength of the flexible coupling, in the region where the turns of the spring arrangements are joined to the respective solid portions, the thickness of these joining turns, measured in the general axial direction of the coupling, may be made to be thicker than that of the remaining turns of the spring arrangement. In addition, if required, the wall thickness of each turn, measured generally along the axis of the coupling, may be substantially constant in a radial direction. Alternatively, this thickness may vary between the radially inner and radially outer ends of each radial section.

Embodiments of flexible coupling according to the invention will now be described in detail, by way of example only, with reference to the accompanying drawings, in which.

As will become apparent from the subsequent detailed description of the preferred embodiments of the invention, there is disclosed herein an improved design of flexible coupling which has sufficient flexibility and resilience to meet the requirements of a "flexible coupling", and yet which is able to transmit accurately i.e. without undue torsional deformation, rotation between an input and an output end of the coupling.

Figure 1:
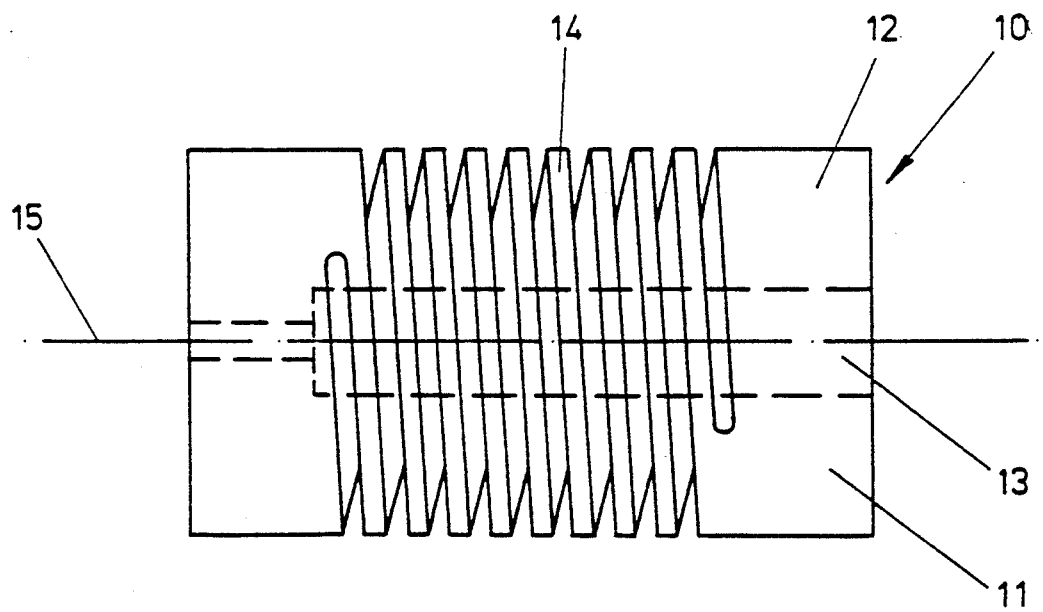
FIG. 1 is a plan view of a first embodiment of flexible coupling according to the invention.

In FIG. 1, the flexible coupling is designated generally by reference 10 and comprises a hollow cylindrical body 11 having an annular wall 12. The wall 12 extends radially outwardly from a hollow interior passage 13 formed in the body 11 to the radially outer periphery of the cylindrical body 11. One end of the body 11 can function as a rotary drive input, whereas the opposite end can serve as the rotary drive output. A helical spring configuration 14 is formed in the annular wall 12, with the turns thereof each extending radially outwardly from the hollow interior 13 of the cylindrical body to the outer periphery thereof.

The helical spring configuration 14 comprises at least two separate spring formations which extend circumferentially and adjacent to each other around the axis 15 of the cylindrical body 11, with each formation extending continuously from a "start" at one end portion of the body 11 to a "finish" at an opposite end portion. As will become evident from the subsequent description with reference to FIG. 2, each spring formation has its own "start" and "finish" and the start and finish of one formation is circumferentially spaced from the respective start and finish of the, or each successive and adjacent spring formation. In the preferred embodiment shown in FIGS. 1 and 2, the helical spring configuration 14 comprises three separate spring formations, so that the spring configuration 14 comprises a "3-start" beam configuration.

The respective "starts" of each spring formation are angularly spaced from each other by 120° and, by arranging at least two separate helical spring formations (three in the preferred embodiments) in the annular wall 12 of the cylindrical body 11, a coupling is provided which is sufficiently flexible in the sense that it can absorb any axial misalignment between an input drive to the input end of the cylindrical body and an output drive from the output end of the cylindrical body, and also any tendency for relative axial, and rotary movement between the input and output drives. However, the helical spring formation 14 is "stiffer" than the known single start helical flexible coupling, so that a more accurate, and less variable transmission of torque can take place between the input end and the output end.

Figure 2:
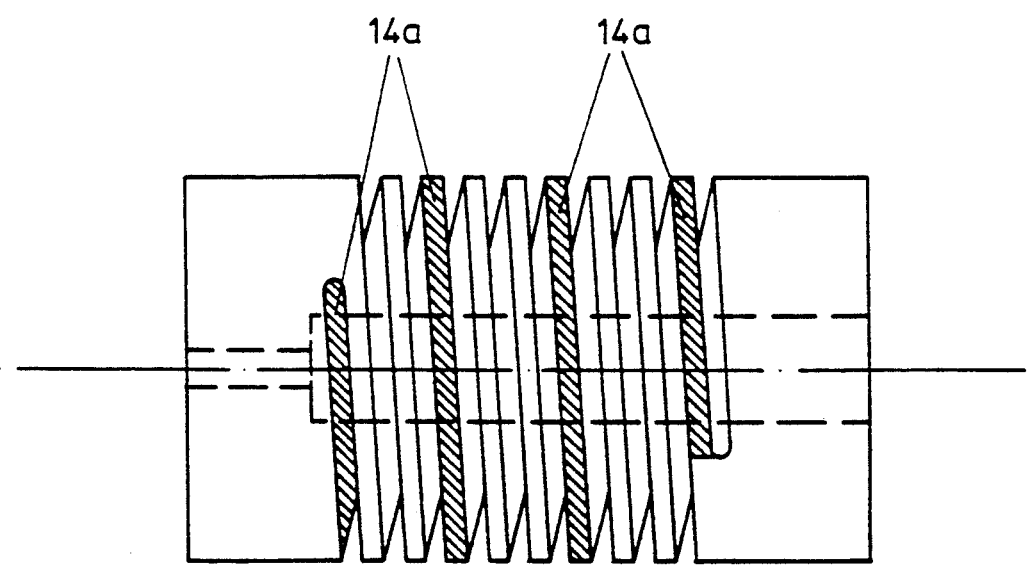
FIG. 2 is a view, similar to FIG. 1, but illustrating in more detail the path defined by one helical spring formation formed in the annular wall of the flexible coupling.

Referring to FIG. 2, one of the three helical spring formations provided in the helical configuration 14 is designated by reference 14a, and has its turns blacked-in for clarity. Thus, it can be seen that, between each successive turn of the formation 14a, there will be located, circumferentially adjacent, respective turns of the two other spring formations which make up the spring configuration 14. The turns of the spring configuration 14 are all integrally formed in the annular wall 12, and jointly contribute to the operating performance of the flexible coupling. It will be noted that the start and finish of the spring formation 14a are angularly separated by about 30°. The respective starts and finishes of the two other spring formations are not shown in detail in the drawings, but, as indicated above, each start of one spring formation will be circumferentially spaced from the successive start of another formation by 120°.

The cylindrical body 10 may be made of aluminium alloy, stainless steel, or suitable plastics, such as Acetal or Torlon, though for some uses customers are finding stainless steel to be particularly suitable. The cylindrical body 10 can be formed as a casting, and then the required spring formations can be formed by machining on a programmed machine tool. However, the required spring formations may be achieved in other ways, such as, for example, by casting or electro-forming.

Figure 3:
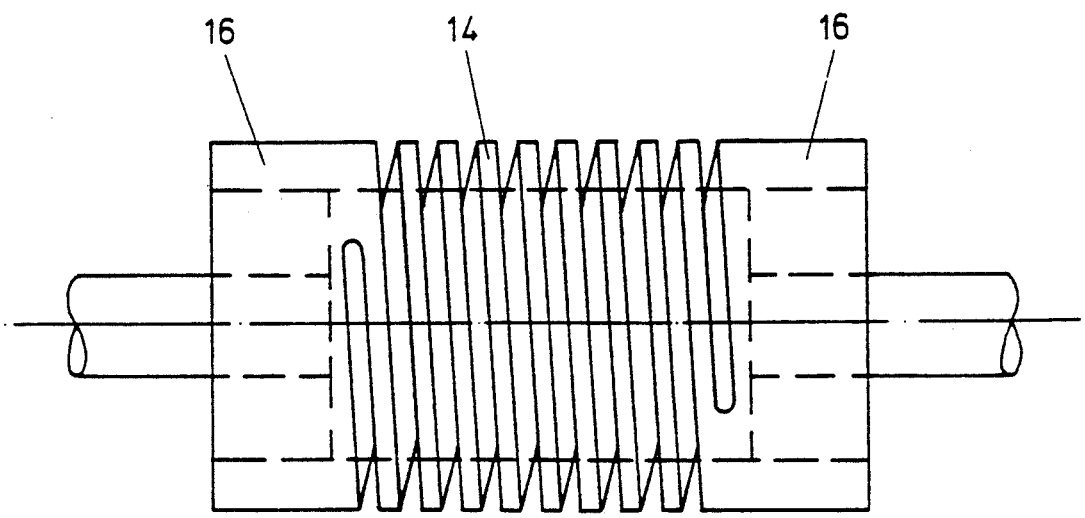
FIG. 3 is a view, similar to FIG. 1, of an alternative embodiment of the invention.

Alternatively, and as shown in FIG. 3, the spring formation 14 may be formed initially by any suitable method, and then separate annular end pieces, in the form of plugs 16, can be attached in any convenient manner one to each axial end of the spring formation 14. The plugs 16 are formed so as to be capable of being coupled drivingly with a respective shaft, or other driving or driven member.

Figure 9:
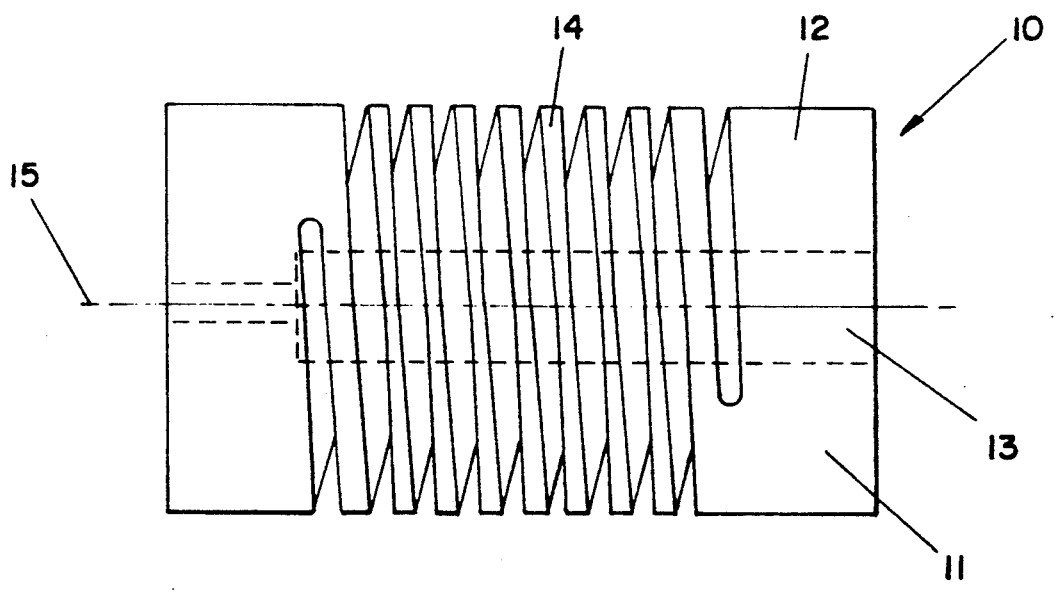
FIG. 9 is a view similar to FIG. 1 except showing spring formation having thicker turns at the end portions than other turns toward the middle thereof.

As shown in FIG. 9, it is preferred that each turn of each spring formation is wedge shaped, as seen in longitudinal section, being wider at its outer periphery than at its inner periphery. However, this is not essential, and each turn may be of uniform thickness throughout its radial extent, or reversely tapering.

Although, not shown, the construction of flexible coupling disclosed herein may be incorporated, if desired, as an integral part of a shaft or drive train.

Figure 4:
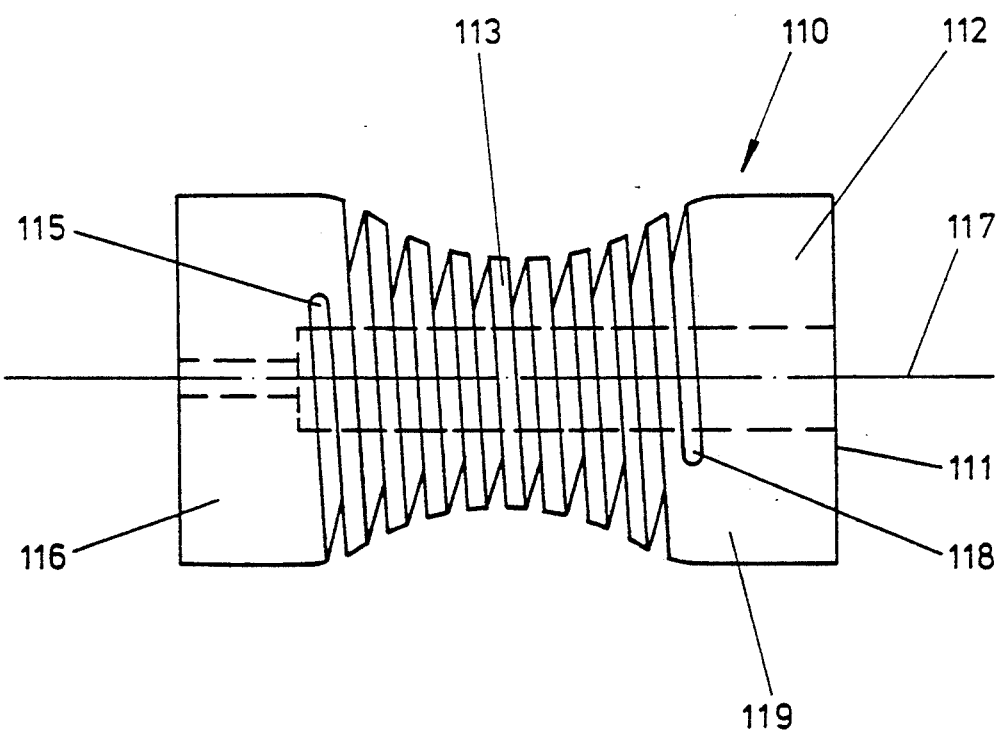
FIG. 4 is a schematic side view of a third embodiment of flexible coupling according to the invention.
Figure 6:
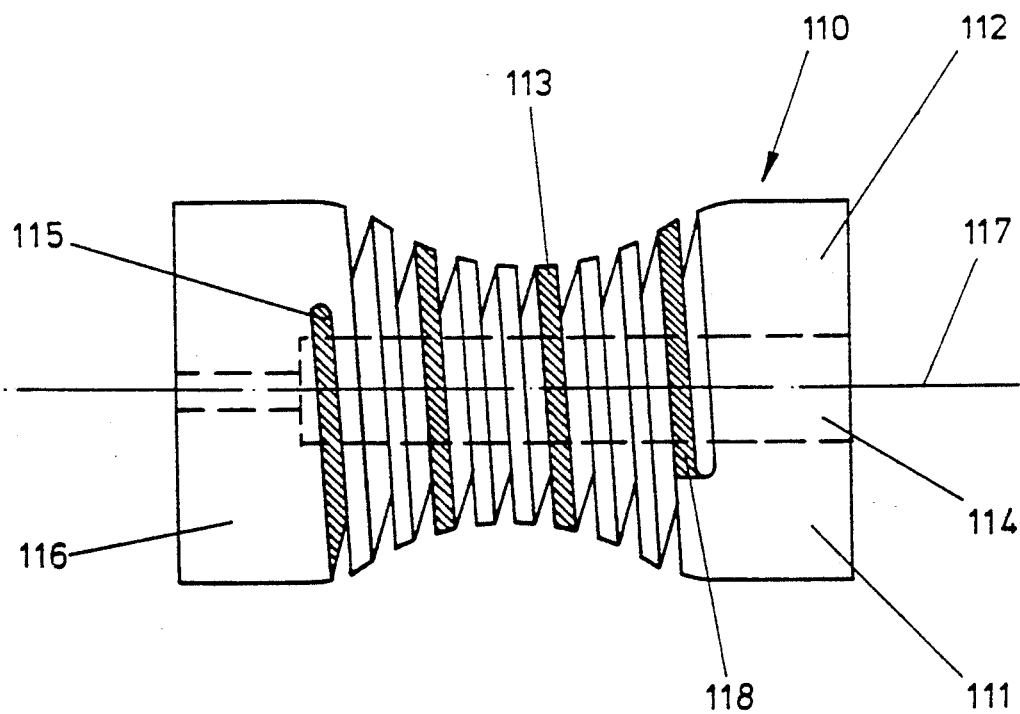
FIG. 6 is a view similar to FIG. 4, but showing one part of a helical spring arrangement thereof in emphasised outline.

Referring now to FIGS. 4 and 6 of the drawings, the embodiment of flexible coupling is designated generally by reference 110 and comprises a hollow cylindrical body 111 having an annular wall 112, a rotary drive input at one end of the body and a rotary drive output at an opposite end of the body, and a helical spring arrangement 113 in the annular wall 112. The turns of the spring arrangement 113 extend radially outwardly from the hollow interior 114 of the body to the outer periphery of the body.

Further, as shown in FIGS. 4 and 6, the spring arrangement 113 extends circumferentially from a start 115 at one solid end piece 116 of the body 111 and about the longitudinal axis 117 of the body 111, through an angle of more than 360°, to the finish 118 of the spring arrangement 113. However, it is envisaged that a satisfactory coupling may be obtained in which the angle subtends is less than 360, with a probable minimum angle of 250°. Also, as will be evident from FIGS. 4 and 6, the outer periphery of the turns of the helical spring arrangement 113 has a greater radial extent at the start 115 and the finish 118, than that of the turns which are intermediate the start and the finish i.e. the spring arrangement 113 defines an annular waist. By this arrangement, it is ensured that the turns at the start and the finish are stronger, and also the intermediate turns will have more resiliency, and these two factors are believed to be responsible for an axial displacement of usual high stress regions away from the start 115 and the finish 118 of the spring arrangement.

The flexible coupling 110 may be made of any convenient material, and preferably aluminium alloy, and especially stainless steel, which is particularly suitable for some new uses of flexible couplings. The coupling may be formed as a casting or forging, and then conveniently the helical spring arrangement 113 is formed by machining, though it may also be formed by other means, such as casting, forging as one piece with the cylindrical body 111, or by electro-forming, laser machining or sintering.

In the embodiment of FIGS. 4 and 6, the spring arrangement 113 extends continuously in a generally helical arrangement around the circumference of the cylindrical body 111 and between the solid end piece 116 at one end and a solid end piece 119 at the opposite end. In addition, the spring formation 113 comprises an arrangement of three separate spring formations having respective turns extending circumferentially and adjacent to each other about the axis 117 of the cylindrical body 111, each formation having its own start and finish with the start and finish of one formation being circumferentially spaced by 120° from the respective start and finish of the adjacent spring formation. To facilitate the understanding of the arrangement of the turns of the three separate spring formations, the path defined by the turns of one only of the three formations is shown blacked-in in FIG. 6, from which it will be seen that the turns of the two other and separate spring formations are wound adjacent to and between successive turns of the illustrated formation.

Thus, the embodiment illustrated in FIGS. 4 and 6 is a three beam type of coupling, and having a waisted centre portion. The dimensions of the waisted portion can be selected or adjusted so as to "tune" the stiffness of the coupling to meet any specific drive requirements.

Figure 5:
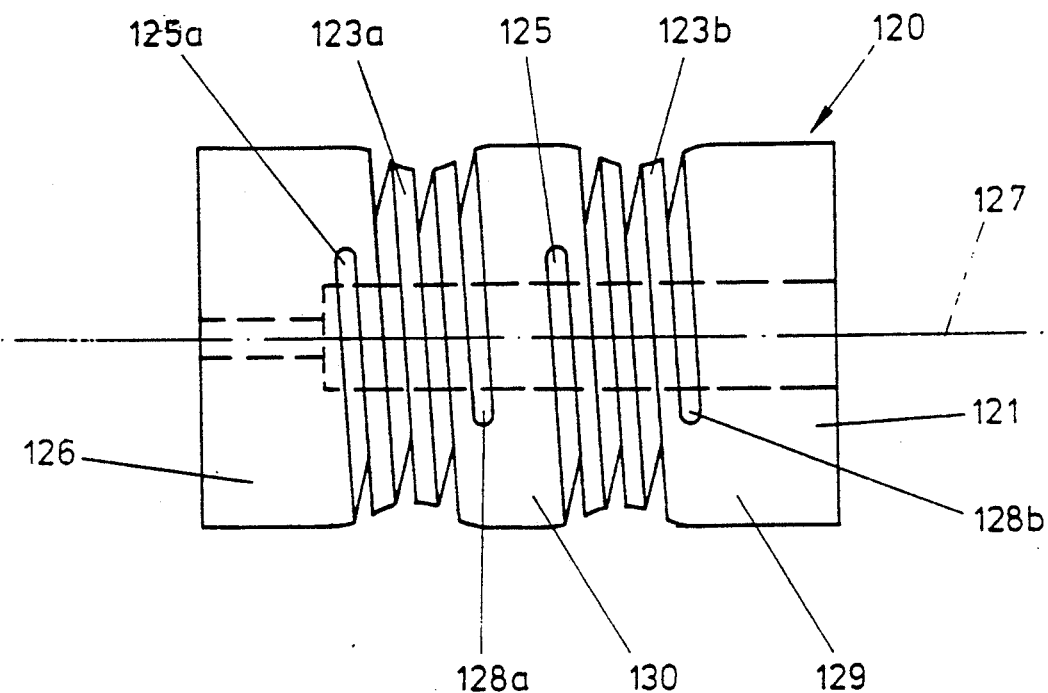
FIG. 5 is a similar view of a fourth embodiment of flexible coupling according to the invention.
Figure 7:
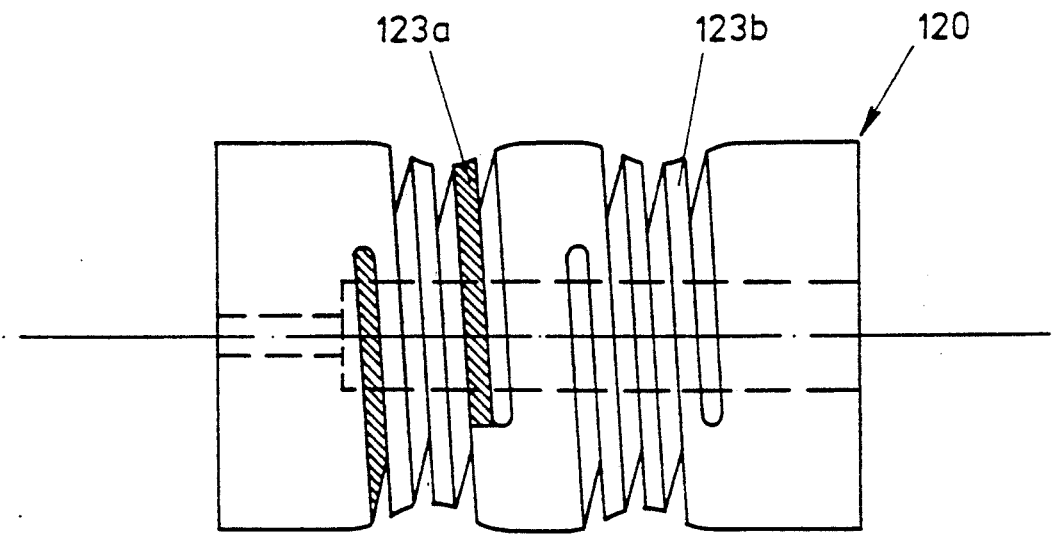
FIG. 7 is a view similar to FIG. 5, and also showing a detailed feature thereof in emphasised outline; and, FIG. 8 is a schematic longitudinal view of a fifth embodiment of flexible coupling according to the invention.

Referring now to FIGS. 5 and 7, an alternative embodiment is illustrated, and corresponding parts are designated by similar reference numerals, but with the addition of 10 to the corresponding parts in the embodiment of FIGS. 4 and 6. The flexible coupling shown in FIGS. 5 and 7 is designated generally by reference 120, and has two separate helical spring arrangements 123a and 123b, having respective starts and finishes 125a, 128a and 125b, 128b. The spring arrangement 123a extends continuously in a helix from its start 125a at the solid end piece 126, through an angle of more than 360° about the axis 127, to its finish 128a, and the arrangement 123b extends similarly from its start 125b to its finish 128b. However, unlike the first embodiment, it will be noted that a solid intermediate piece 130 is provided, and the finish 128a of the arrangement 123a and also the start 125b of the arrangement 123b are arranged in this solid intermediate piece 130.

As in the embodiment of FIGS. 4 and 6, the spring arrangements 123a and 123b are each formed by "three beam type couplings" as shown and described above concerning the helical spring arrangement 113. FIG. 7 illustrates in emphasised outline the path defined by one of these three spring formations for the spring arrangement 123a. Thus, the embodiment of FIGS. 5 and 7 is a six beam type coupling, and has similar waisted arrangement of the helical spring arrangements, with similar advantages. The coupling 120 may be made of similar material to the coupling 110, and may also be provided with the axial enlargement of the start and/or finish of each spring arrangement (not shown) in similar manner to that described above for the first embodiment.

Although, not shown, it is preferred that each turn of each spring formation is wedge shaped, as seen in longitudinal section, being wider at its outer periphery than at its inner periphery. However, this is not essential, and each turn may be of uniform thickness throughout its radial extent, or reversely tapering.

Although, not shown, the construction of flexible coupling disclosed herein may be incorporated, if desired, as an integral part of a shaft or drive train.

Figure 8:
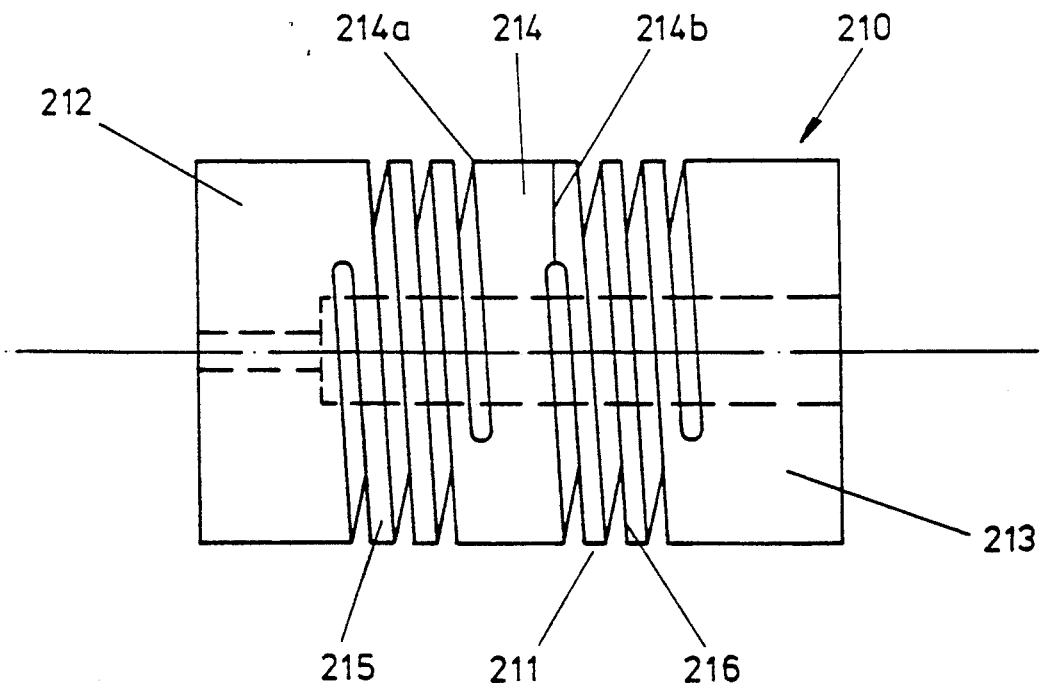

Referring now to FIG. 8 of the drawings, there is shown schematically an embodiment of flexible coupling which is particularly suitable for transmitting drive torque between a drive shaft (not shown) and a driven shaft (also not shown). The flexible coupling is designated generally by reference 210 and comprises a cylindrical body 211 having a pair of opposed end portions 212 and 213, and a solid intermediate portion 214. The end portions 212 and 213 are internally recessed, preferably by machining, so as to be able to have a shaft or other drive or driven element coupled therewith. Apart from this internal formation, the end portions 212 and 213 are solid end pieces of the flexible coupling 210. Similarly, the intermediate portion 214, which is located midway between the end portions 212 and 213, also is of solid construction.

Between each of the end portions 212 and 213 and the facing ends 214a, 214b of the intermediate portion 214, there are arranged respective helical spring arrangements 215 and 216. Thus, the helical spring arrangement 215 interconnects the end portion 212 and the facing end 214a of the intermediate portion, whereas helical spring arrangement 216 interconnects the end portion 213 and the facing end 214b of the intermediate portion.

Although not shown in detail in FIG. 8, each of the helical spring arrangements 215, 216 comprises a multistart arrangement of separate spring formations which are wound one within the other. In the preferred embodiment, each spring arrangement comprises three separate "beams" which form helical springs which are wound one within the other, each formation extending in a spiral from a start at one of the solid portions (212, 213, 214) to a finish at the corresponding other portion and about the general longitudinal axis of the cylindrical body 211 through an angle of at least 360°.

Therefore, in respect of each spring arrangement 215, 216, the "starts" will be angularly spaced from each other by 120°, and the respective "finishes" will be similarly spaced apart from each other angularly.

The flexible coupling 210 is made of stainless steel, since this is a material in which customers are presently requiring flexible couplings to be made of. Although stainless steel is a very suitable material for certain uses of flexible coupling, it has the disadvantage that it is a somewhat "stiff" material, and which cannot easily be machined. In order to provide a required degree of resilience to the coupling to meet customer requirements, and particularly customers who specify stainless steel, it has been found necessary to ensure that the turns of each spring formation of the multi-beam arrangement 215 or 216 must extend about the axis of the cylindrical body 211 through at least 360°, and preferably up to 400°.

The flexible coupling shown in FIG. 8 is particularly suitable for transmitting drive between drive and driven elements. However, it should be understood that the features of the illustrated embodiment of flexible coupling could readily be incorporated, if desired, in a shaft or drive train, as an integral part thereof.

Alternatively, the flexible coupling may serve as a resilient mounting, or as a "damper", in which case each of the end portions 212 and 213 will be securely attached to suitable mounting points on pieces of machines which are to be resiliently coupled together.

I claim:

1. A flexible coupling for providing precise transmission of angular rotation from one end to the other which comprises a hollow cylindrical body having an annular wall, and a torsionally stiff helical spring configuration formed in the annular wall with the turns thereof each extending radially outwardly from the hollow interior of the cylindrical body to the outer periphery of the cylindrical body:

in which the helical spring configuration comprises a spring formation extending in the annular wall with turns circumferentially and adjacent to each other around the axis of the cylindrical body, said formation extending in a continuous spiral from a start at one end portion of the cylindrical body to a finish at the opposite end portion and having a uniform radius, and in which the start and finish of each spring formation is joined to an axial end piece of the hollow cylindrical body and the turns of the spring formation are axially thicker adjacent to said end pieces than the remaining turns thereof.

2. A flexible coupling according to claim 1, in which the cylindrical body is made of stainless steel.

3. A flexible coupling for providing precise transmission of angular rotation from one end to the other which comprises a hollow cylindrical body having an annular wall, and a torsionally stiff helical spring arrangement in the annular wall with the turns thereof each extending radially outwardly from the hollow interior of the body to the outer periphery of the body, in which:

the helical spring arrangement extends circumferentially from a start at one of said ends of the body and about the longitudinal axis of the body to the finish at the opposite end portion, the start and finish of the spring configuration being joined to an axial end place of the hollow cylindrical body and, the radial extent of the turns of the helical spring arrangement is greater adjacent said end pieces then the remaining turns thereof.

4. A flexible coupling for providing precise transmission of angular rotation from one end to the other according to claim 3, in which the greater radial extent of the configuration adjacent to said end pieces is achieved by making the radial extent of the outer peripheries of the remaining turns to be less than that of the turns at the turns adjacent said end pieces.

5. A flexible coupling according to claim 3, in which the axial thickness of each turn at the start and finish is greater than for the remaining turns.

6. A flexible coupling according to claim 3, in which the coupling is made of stainless steel.

* * * * *